J. W. HOOVER.
HEADER.
APPLICATION FILED APR. 23, 1912.
1,042,438.
Patented Oct. 29, 1912.
3 SHEETS—SHEET 1.
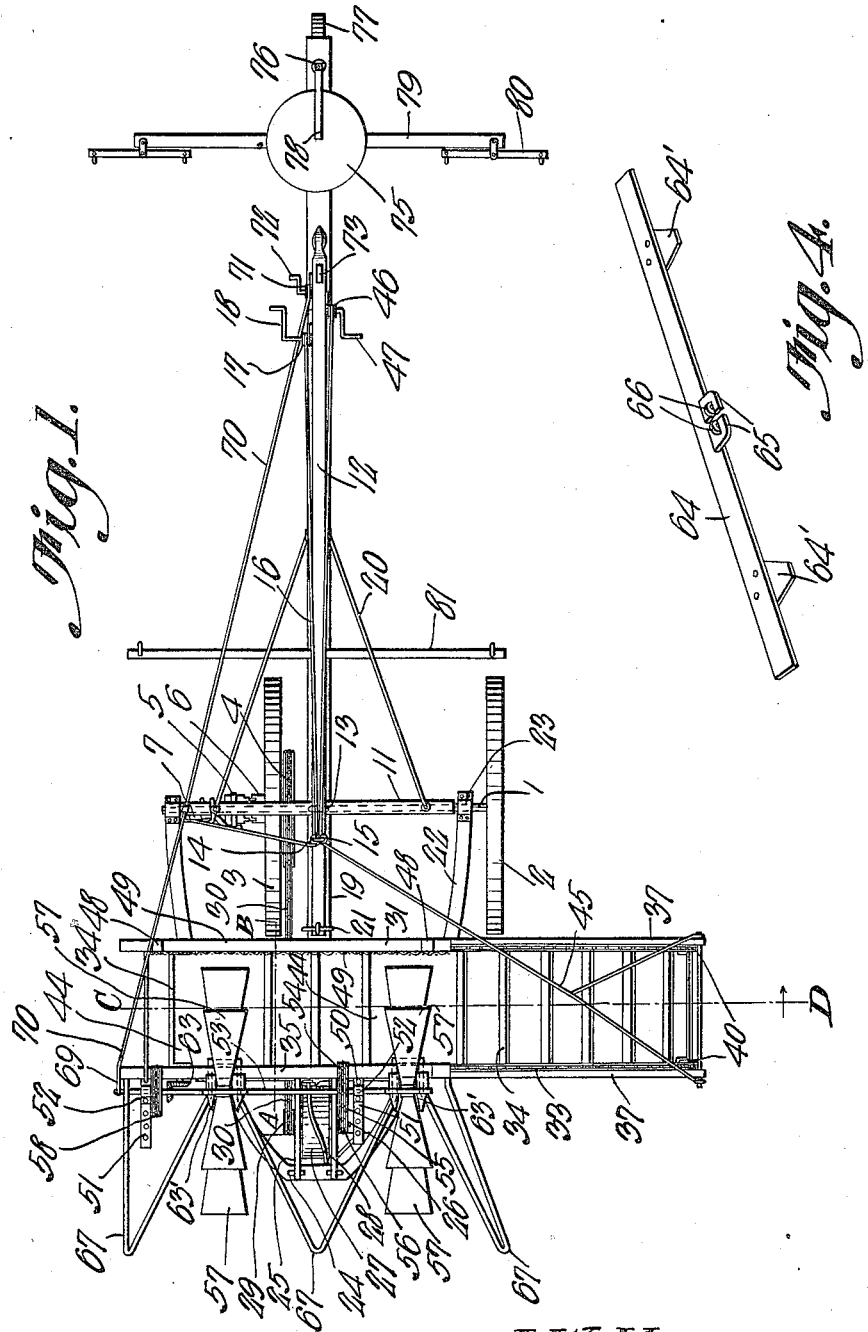
Witnesses
J. W. Hoover
Inventor
by
Attorneys J. W. HOOVER.
HEADER.
APPLICATION FILED APR. 23, 1912.
1,042,438.
Patented Oct. 29, 1912.
3 SHEETS—SHEET 2.
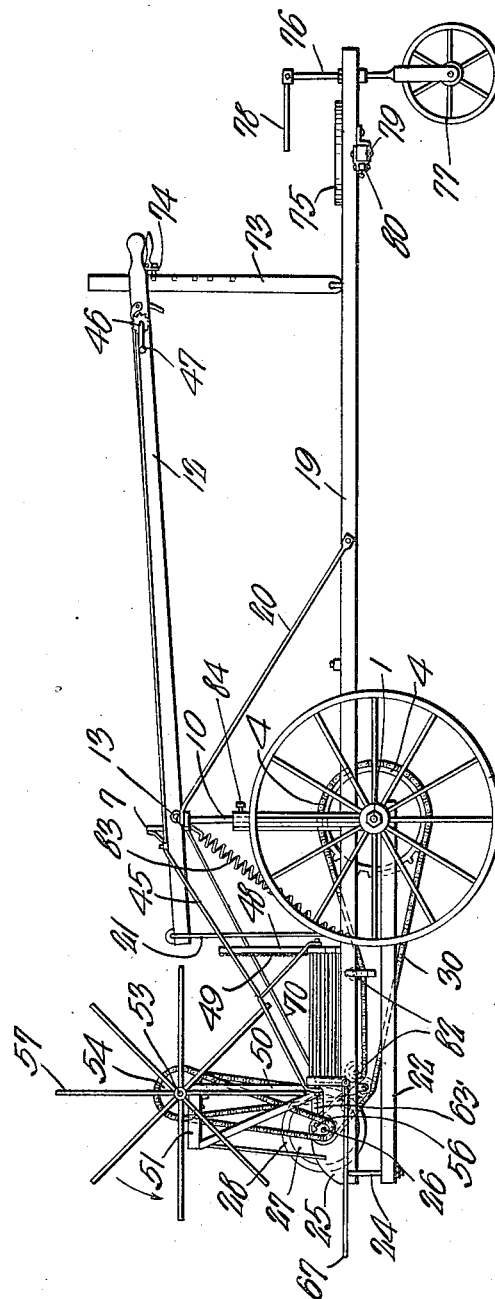
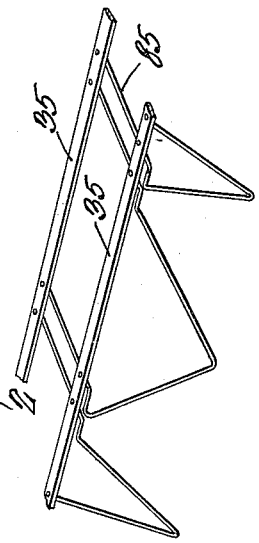
Witnesses
J. W. Hoover, Inventor
by ____ Attorneys J. W. HOOVER.
HEADER.
APPLICATION FILED APR. 23, 1912.
1,042,438.
Patented Oct. 29, 1912.
3 SHEETS—SHEET 3.
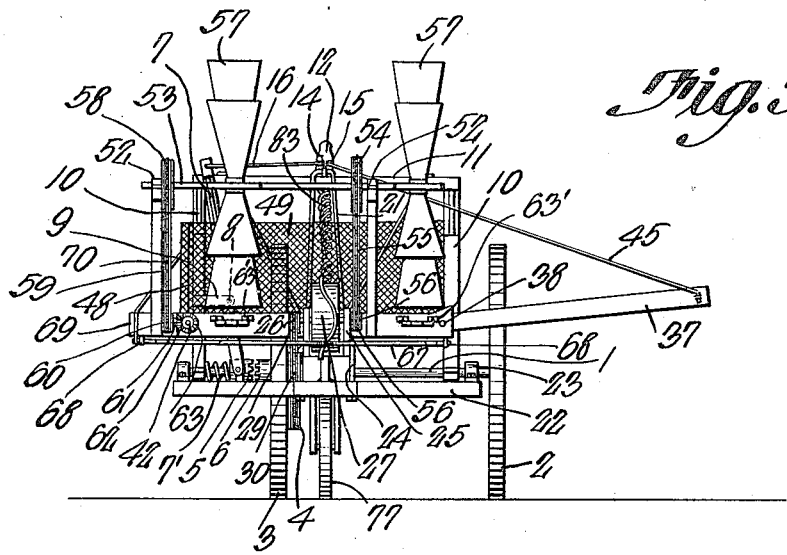
*Fig. 3.*
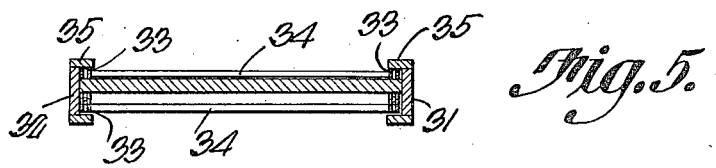
*Fig. 5.*
*Fig. 6.*
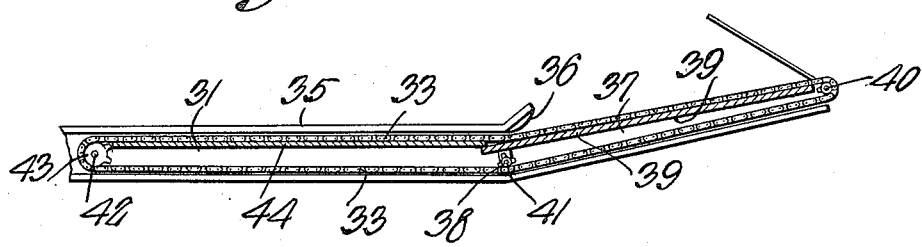
Witnesses
J. W. Hoover, Inventor
by C. A. Snow & Co., Attorneys
COLUMBIA PLANOGRAPH CO., WASHINGTON, D. C.

UNITED STATES PATENT OFFICE.

JOSEPH W. HOOVER, OF WINFIELD, KANSAS.

HEADER.

1,042,438.  Specification of Letters Patent.  Patented Oct. 29, 1912.

Application filed April 23, 1912. Serial No. 692,624.

*To all whom it may concern:*

Be it known that I, JOSEPH W. HOOVER, a citizen of the United States, residing at Winfield, in the county of Cowley and State of Kansas, have invented a new and useful Header, of which the following is a specification.

This invention relates to headers for removing the tops of Kafir corn or sorghum and one of its objects is to provide means whereby the sorghum is bunched in the paths of sickles located directly under reels of novel form whereby the bunches of vegetation are cut and directed onto a conveyer, this construction resulting in the gathering of the volunteer corn into the row and the consequent saving of practically all of the tops.

A further object is to provide improved means for operating the knives or sickles whereby it becomes unnecessary to actuate the cutting mechanism at a high speed and the power required for operating the machine is consequently reduced.

A further object is to provide a machine of this character which can be readily adjusted to different heights.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.
In said drawings:—Figure 1 is a plan view of the machine. Fig. 2 is a side elevation thereof. Fig. 3 is a front elevation. Fig. 4 is a perspective view of the knife or sickle bar. Fig. 5 is a section on line A—B Fig. 1, said section being taken solely through the conveyer. Fig. 6 is a section on line C—D Fig. 1. Fig. 7 is a perspective view of guide fingers of a modified form.

Referring to the figures by characters of reference 1 designates an axle mounted for rotation and supported, at one end, by a wheel 2, and at a point between its ends, by a wheel 3, these wheels normally rotating on the axle. A sprocket wheel 4 is secured to and rotates with the axle and a clutch member 5 is feathered on said axle and is adapted to engage a clutch member 6 which is formed on or secured to the wheel 3 so as to rotate therewith. A spring 7' arranged on the axle 1 serves to hold the clutch member 5 normally in engagement with the clutch member 6 and said clutch member 5 is connected to a lever 7 which is fulcrumed, as at 8, upon a bracket 9 extending inwardly from one of a pair of standards 10 upstanding from and loosely engaged by the axle 1. The upper ends of the standards are connected by a top strip 11 and fulcrumed upon this top strip is an adjusting lever 12 provided, adjacent its fulcrum 13, with sheaves 14 and 15. A controlling cable or chain 16 is mounted on the sheave 14 and is connected at one end to the upper end of lever 7 while its other end extends rearwardly along the adjusting lever 12 and is connected to a drum 17 adapted to be rotated by means of a crank 18. Thus it will be seen that the flexible connection 16 can be wound or paid out as desired so as to shift the lever 7 against the stress of spring 7', thus disengaging the clutch member 5 from the clutch member 6 or, when the connection 16 is paid out, permitting the spring 7' to shift the clutch member 5 into engagement with the clutch member 6.

A beam 19 extends over the axle 1 and between the standards 10 and is connected to the top strip 11 by means of rearwardly and downwardly converging braces 20 which are pivotally connected at their ends to said top strip 11 and to the sides of the beam 19. The front end of the lever 12 is connected to the beam 19 by means of a pivoted hanger 21. A frame 22 made up of forwardly converging side strips is pivotally connected, as at 23, to the axle 1 close to its ends and extending upwardly from the front end of this frame 22 are links 24 pivotally connected to parallel arms 25 extending forwardly from the end of the beam 19.

Journaled within the arms 25 is a shaft 26 to which is fastened a wheel 27 having a wabble rib 28 extending from its periphery. A sprocket 29 is secured to one end of this shaft and receives motion through a chain 30 from the sprocket 4.

Extending transversely of and secured to the front end portion of the beam 19 are the side strips 31 and 32 of an endless conveyer made up of chains 33 connected by slats

34. Those portions of the chains between the side strips 31 and 32 have their upper flights overhung by guard plates 35, as clearly indicated in Fig. 5. The side strips 31 and 32 are recessed, at one end, as shown at 36 and projecting into these recesses are the lower ends of the side strips 37 of an elevator, said side strips being pivotally connected to the strips 31 and 32 by a rod 38 or the like. The upper runs of the chains 33 slide under the upper walls of the recesses 36 and are guided along the inclined board 39 which connects the side strips 37 of the elevator. Sprockets 40 are located at the upper or outer end of the elevator board 39 and additional sprockets 41 constituting guides, are supported under the lower or inner end of the board 39, these sprockets being engaged by the endless chains 33. A shaft 42 is journaled within the side strips 31 and 32 adjacent those ends of the side strips farthest removed from the elevator and this shaft carries sprockets 43 on which the chains 33 are mounted. A board 44 connects the side strips 31 and 32 and constitutes a support for the slats 34 of the upper run of the endless conveyer. An adjusting cable, chain or other flexible element 45 is connected to the outer or upper ends of the side strips 37 and engages the sheave 15, this connection 45 extending rearwardly along the lever 12 and being connected to a winding drum 46 or the like adapted to be rotated by means of a crank 47. Thus it will be seen that by rotating the crank 47 the connection 45 can be wound upon the drum 46 or unwound therefrom, thus to adjust the elevator frame angularly with relation to the side strips 31 and 32.

Upstanding from the side strip 31 are standards 48 carrying a backing 49 preferably formed of metal fabric. Standards 50 extend from the front side strip 32 and have heads 51 extending forwardly therefrom and on which bearings 52 are adjustably mounted, these bearings carrying a reel shaft 53. This shaft has a sprocket 54 secured thereto which receives motion, through a chain 55, from a sprocket 56 secured to the shaft 26. Secured to the shaft 53 at points above the end portions of the strips 32, are reels each of which is made up of a plurality of radially disposed blades or paddles 57 movable downwardly to points close to the strip 32.

A sprocket 58 is secured to shaft 53 and transmits motion, through a chain 59, to a sprocket 60 secured to a shaft 61. This shaft has a bevel gear 62 revoluble therewith which meshes with a bevel gear 63 secured to the shaft 42. Thus it will be seen that motion may be transmitted from the shaft 53 to the conveyer and elevator.

Extending forwardly from the strip 32 and directly under the reels 57 are fingers 63' arranged in pairs, one pair being located directly under each reel. A bar 64 is slidable within these fingers and extends transversely of the beam 19, said bar carrying a double edge blade 64' near each end which is adapted to coöperate with the fingers 63' for the purpose of cutting vegetation guided to position between the fingers. Brackets 65 extend forwardly from the middle portion of the bar 64 and carry anti-friction rollers 66 which are thus supported in contact with the wabble rib or flange 28. Obviously, therefore as the wheel 27 rotates, the rib 28 will cause the bar 64 to reciprocate, thus shifting the blades 64' across the spaces between the fingers 63' and cause them to sever the vegetation located in said spaces.

Guide fingers 67 extend forwardly from the strip 32 and are so positioned as to gather the vegetation and direct it into the spaces between the fingers 63', these guide fingers 67 being preferably hinged to the strip 32, as shown at 68. An arm 69 may be extended from one end of the set of fingers 67 and can be connected by a cord or chain 70, to a drum or other winding element 71 carried by the lever 12 and which may be rotated by means of a crank 72. Thus it will be seen that by winding the flexible element 70 on the drum 71, the set of fingers 67 can be swung upwardly and, by paying out the connection 70, the fingers 67 can be allowed to gravitate downwardly at their forward ends.

A locking strip 73 is pivotally connected to the beam 19 and is adapted to be engaged by a spring pressed dog 74 carried by the free end portion of lever 12, thus to hold said lever against up and down movement at its free end. A platform 75 is mounted on the beam 19 close to the strip 73 and back of this platform is a steering head 76 which extends downwardly through the beam 19 and has a steering wheel 77 at its lower end, there being a lever 78 at its upper end whereby the head 76 can be rotated by the occupant of the platform 75.

A whiffletree 79 is connected to the beam 19 close to the platform 75 and has swingletrees 80 connected to it. A cross bar 81 is connected to the beam 19 in advance of the whiffletree 79 and the draft animals may be harnessed to this cross bar and to the swingletrees 80.

It will be apparent that when the free or rear end of lever 12 is pulled downwardly and locked to the strip 73, the hanger 21 will pull upwardly on the front end of the beam 19, thereby elevating the conveyer and the cutting mechanism and also pulling upwardly through links 24, upon the front end of the frame 22. As long as the clutch member 5 is out of engagement with the clutch member 6, the machine can be moved forward and none of the mechanism thereof will be operated. When, however, clutch member 5 is shifted into engagement with clutch member 6, motion will be transmitted from the axle 1 through sprocket 4, chain 30, and sprocket 29, to the shaft 26. Wheel 27 will therefore be actuated and the wabble rib 28 will cause the knives 64' to be reciprocated. At the same time motion will be transmitted through sprocket 56, chain 55, and sprocket 54 to the reel shaft 53 and the blades constituting the reels will be rotated in the direction indicated by the arrow in Fig. 2 so as to strike the tops of the vegetation and cause the material to fall downwardly onto the board 44 so as to be carried off by the conveyer slats 34. The backing wall 49 will prevent the vegetation from being thrown rearwardly past the conveyer. Motion will also be transmitted through sprocket 58, chain 59 and sprocket 60, to the shaft 61 carrying gear 62 and this gear will operate the shaft 42 and cause the actuation of the conveyer. As the machine moves forward the sorghum or Kafir corn will be directed into the spaces between the fingers 63' constituting each pair and will be severed by the reciprocating knives 64'. At the same time the blades of the reels will lay the cut material on the conveyer so that said material will be moved transversely of the machine up the board 39 of the elevator, and into a wagon or other receptacle located at the side of the machine.

By providing the guide fingers 67, it will be seen that the volunteer corn will be directed to the knives and waste is thus reduced to the minimum. Furthermore these fingers, by being inclined downwardly from the strip 32, can be used to lift fallen grain into position to be cut. It will be apparent that by means of lever 12, the cutting mechanism can be raised or lowered to the proper elevation, the strip 73 and the dog 74 being utilized to lock the cutting mechanism in any position to which it may be adjusted.

The chain 30 is provided with any suitable arrangement of tighteners 82 whereby the chain can be maintained taut at all times during the adjustment of the beam 19 relative to the axle 1.

It will be apparent that the machine herein described will cut two rows simultaneously, the wheel 3 being movable between the rows being cut.

A spring, such as shown at 83, may be connected to the cross beam 11 and to the beam 19 so as to facilitate the elevation of the beam by means of lever 12.

As shown particularly in Figs. 2 and 3 the standards 10 can each be made of telescopically connected sections having any suitable means, such as a set screw 84, for locking the parts of the standard against movement. Lever 7 is likewise preferably extensible so that it can be adjusted with the standards 10.

Instead of providing guide fingers hingedly mounted, as shown at 67 in Figs. 1 and 2, guide fingers, such as illustrated in detail in Fig. 7, may be employed. These fingers are formed of heavy metal rods 85 bolted or otherwise secured to the front and back portions of the platform structure on which the endless conveyer 33—34 is mounted. These rods are bent to the points of the fingers 63' and are then inclined forwardly and downwardly so as to operate to elevate fallen grain to the path of the blades 64'. This form of guide fingers is not hingedly mounted, as is the form shown in Figs. 2 and 3, but is fixedly connected to the conveyer structure. It is to be understood that these guide fingers can be used in lieu of the fingers 67 should it be so desired.

What is claimed is:—

1. In a header, the combination with a wheel supported axle, and a structure carried thereby, of a beam extending loosely through said structure and above the axle, a lever fulcrumed on the structure, a steering wheel at the rear end of the beam, cutting and conveying mechanism supported by the front end of the beam, a connection between the lever and the front end portion of the beam, a yielding connection between said portion of the beam and the structure, and coöperating means upon the beam and lever for locking said lever against angular adjustment relative to the beam.

2. In a header, the combination with a wheel supported axle, and a structure upstanding from the axle, of a beam extending loosely through the structure, a steering wheel at the rear end of the beam, a conveyer carried by the front end of the beam and extending transversely thereof, cutting mechanism movable transversely of the beam and in front of the conveyer, means for transmitting motion from one of the supporting wheels to the cutting and conveyer mechanism, an adjusting lever fulcrumed on the structure, a connection between said lever and the front end portion of the beam, and coöperating means upon the beam and lever for locking said lever against movement relative to the beam.

3. A header including a wheel supported axle, a structure upstanding therefrom, a beam extending loosely through the structure, a steering wheel at the rear end of the beam, transversely movable cutting means at the front end of the beam, a frame pivotally connected to the axle and extending forwardly therefrom, pivotal connections between said frame and the front end of the beam, an adjusting lever fulcrumed on said structure, a link connection between said lever and the front end portion of the beam, and coöperating means upon the lever and beam for locking said lever against movement relative to the beam.

4. A header including a wheel supported axle, a structure upstanding therefrom, a beam extending loosely through the structure, a steering wheel at the rear end of the beam, cutting mechanism at the front end of the beam, a frame pivotally mounted on the axle and extending forwardly therefrom, a pivotal connection between the frame and the front end of the beam, a lever fulcrumed on said structure, a connection between the lever and the front end portion of the beam, coöperating means upon the beam and lever for locking said lever against movement relative to the beam, and means for transmitting motion from one of the supporting wheels to the cutting mechanism irrespective of the adjustment of the beam relative to the lever.

5. In a header the combination with a wheel supported axle, and a structure upstanding therefrom, of a beam extending loosely through the structure, a frame constituting a connection between the front end of the beam and the axle, a steering wheel at the rear end of the beam, cutting mechanism at the front end of the beam, an adjusting lever fulcrumed on said structure, a connection between the lever and the front portion of the beam, and coöperating means upon the beam and lever for locking the lever against movement relative to the beam.

6. In a header the combination with a wheel supported axle, and a structure upstanding therefrom, of a beam extending loosely through the structure, a frame constituting a connection between the front end of the beam and the axle, a steering wheel at the rear end of the beam, cutting mechanism at the front end of the beam, an adjusting lever fulcrumed on said structure, a connection between the lever and the front portion of the beam, coöperating means upon the beam and lever for locking the lever against movement relative to the beam, means for transmitting motion to the cutting mechanism from one of the supporting wheels, and means connected to the lever for controlling the transmission of motion to the cutting mechanism.

7. In a header the combination with a wheel supported axle, and a structure upstanding therefrom, of a beam extending loosely through the structure, a frame constituting a connection between the front end of the beam and the axle, a steering wheel at the rear end of the beam, cutting mechanism at the front end of the beam, an adjusting lever fulcrumed on said structure, a connection between the lever and the front portion of the beam, coöperating means upon the beam and lever for locking the lever against movement relative to the beam, a conveyer for receiving cut material, an adjustable elevator at one end of the conveyer, and means carried by the lever for adjusting the elevator relative to the conveyer.

8. In a header the combination with a wheel supported axle, and a structure upstanding therefrom, of a beam extending loosely through the structure, a frame constituting a connection between the front end of the beam and the axle, a steering wheel at the rear end of the beam, cutting mechanism at the front end of the beam, an adjusting lever fulcrumed on said structure, a connection between the lever and the front portion of the beam, coöperating means upon the beam and lever for locking the lever against movement relative to the beam, guide fingers extending forward from the cutting mechanism and mounted to swing upwardly and downwardly, and means carried by the lever for adjusting said fingers angularly relative to the plane of movement of the cutting mechanism.

In testimony that I claim the foregoing as my own, I have hereto affixed my signature in the presence of two witnesses.

JOSEPH W. HOOVER.

Witnesses:
J. A. McDermott,
O. C. Henderson.

---

Copies of this patent may be obtained for five cents each, by addressing the "Commissioner of Patents, Washington, D. C."